Sept. 18, 1951  A. F. REILLY ET AL  2,568,512
ASSEMBLY OF SHELLS OF CONTAINERS
Filed Aug. 21, 1948

INVENTOR.
Alfred F. Reilly
Fritz Gengenbach
BY
Barlow & Barlow
ATTORNEYS.

Patented Sept. 18, 1951

2,568,512

UNITED STATES PATENT OFFICE 2,568,512

ASSEMBLY OF SHELLS OF CONTAINERS

Alfred F. Reilly and Fritz Gengenbach, North Attleboro, Mass., assignors to Evans Case Co., a corporation of Massachusetts Application August 21, 1948, Serial No. 45,534

1 Claim. (Cl. 219—10)

This invention relates to the assembly of two shells of a container such as a table lighter, condiment holder or the like which is made in halves from die cast pieces and then these halves soldered together.

In the assembly of two shells of a container in order to get a good joint or miter between the edges which are to be joined together, it is necessary that the edges be in accurate alignment in order to reduce the necessity of filing or sandbobbing after the same has been soldered. Various methods have been tried such as sputter welding or jigs without real successful conclusion.

One of the objects of this invention is to provide for an absolute miter or alignment of the two edges of halves of a hollow container for the reception of solder.

Another object of this invention is to provide a temporary holding of two edges of the halves of a hollow container in absolute alignment or miter so that when solder is applied, the same will provide a perfect joint, and the necessity of filing or sandbobbing is reduced to a minimum.

A more specific object of this invention is to provide alignment by holding the two halves in position by such fitting means as dies to receive the halves.

More specifically, the invention consists in making electrotypes of the halves and then welding the halves in position temporarily and then removing them from the dies and thereafter soldering.

With these and other objects in view, the invention consists of certain novel features of construction, as will be more fully described and particularly pointed out in the appended claim.

In proceeding with this invention we provide an electrotype for each of the halves of the container which is to be secured together thereby providing an arrangement so that the halves will accurately fit in some holding device for alignment. The electrotypes are then mounted in die holders which are caused to move toward each other on pins or slides for their accurate positioning. The die holder also provides an arrangement so that current may be passed through the dies to be in turn transmitted to the halves and the halves welded together in the locations along which they contact. The edges of the halves are first aligned on some plane surface so as to provide the edges in substantially a single plane, and even then when brought together, it is found that there will be some high points which will contact making an ideal arrangement for a temporary connection by welding between them. The container after welded in a holder of this character is then taken from the electrotypes or dies for further operation. Thereafter, hard solder is applied in the form of a mixture of paste and small particles of solder and heated to a temperature to cause such solder to melt which runs into the joint by capillary attraction when the pieces are in a horizontal position, thus causing a very fine film of solder to be utilized for such connection without running outwardly of the joint.

Figure 4:
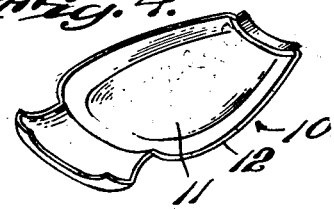
Figure 4 is a perspective view of one of the halves to be soldered.
Figure 6:
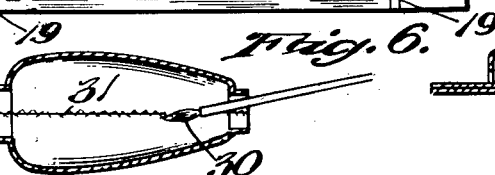
Figure 6 is a sectional view of two halves showing the solder being applied thereto after being held in position by welding.
Figure 5:
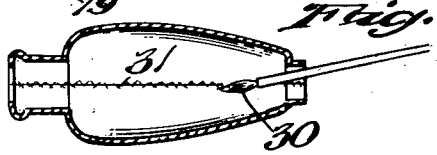
Figure 5 is a sectional view showing one of the halves as receiving an operation to position its edge in a single plane.

With reference to the drawings, we have illustrated in Figure 4 at 10 one of the two pieces, which are in substantial halves, of a table lighter or condiment holder which are to be joined together to form a hollow container. Each of these pieces has a body portion 11 and edges 12, the edges being desired to be contacted in accurate relation for soldering. The edges 12 of the halves are first surfaced as shown in Figure 5 on some sort of an abrasive or grinding surface 13 in order to form them in substantially a single plane.

Figure 1:
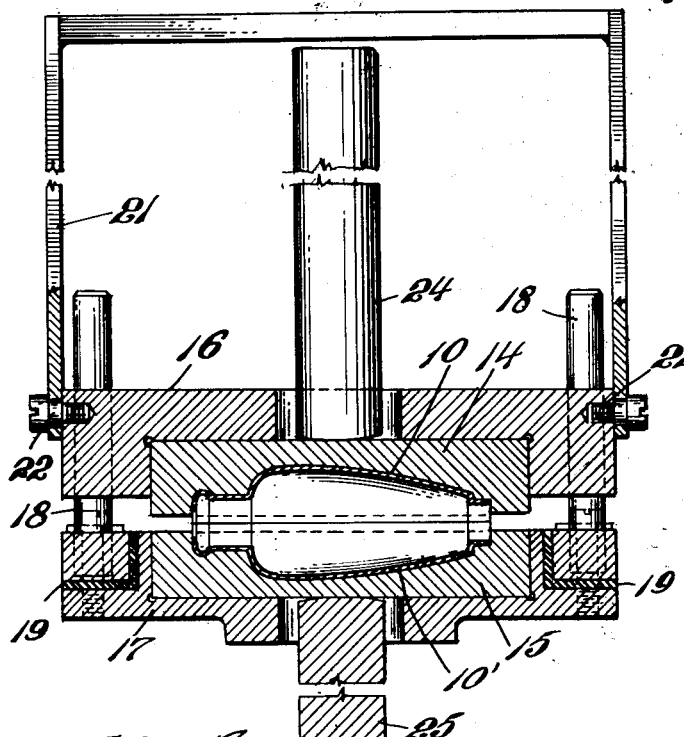
Figure 1 is a sectional view showing the two halves of a hollow container held in position by electrotypes in die holders and in a position for welding.

An electrotype 14 is made for the upper half 10 of the container, and an electrotype 15 is made for the lower half 10' of the container, as shown in Figure 1. These electrotypes are then mounted in die holders, the upper one in the die head 16 and the lower one in the die head 17. This lower die head 17 carries four upstanding guide pins 18 which are mounted in the die base 17 and insulated therefrom as at 19. These pins extend through openings 20 in the die head 16 which is slidably mounted on these pins so as to be accurately guided toward and from the die base 17. A yoke 21 is utilized for lifting the die head and is connected thereto in a pivotal relation by screws 22.

Figure 2:
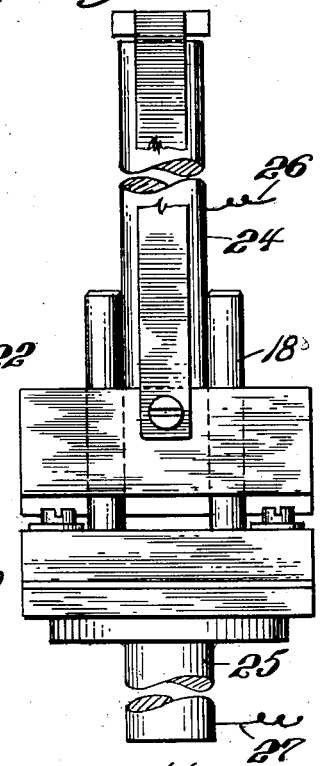
Figure 2 is an edge view of the structure shown in Figure 1.
Figure 3:
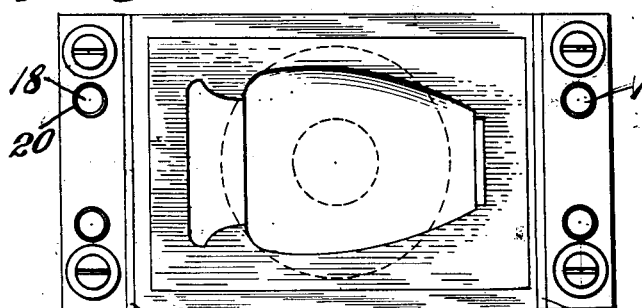
Figure 3 is a top plan view of the lower die and its holder shown in Figure 1.

The electrotypes 14 and 15 are of copper and extending from a good contact with each of these is a post or conductor 24 to contact with the electrotype 14 and post 25 to contact with the electrotype 15. These are each connected to a source of electrical energy as at 26 and 27, as indicated in Figure 2.

The electrotypes are an exact counterpart of each of the halves 10 of the container and thus when the half which is of the form of its corresponding electrotype is positioned therein, it will be held accurately with respect to the die set. The two pieces of the container to be joined are each positioned in its respective electrotype 14 and 15 and then the die set is brought together to cause the edges 12 to accurately contact and form an absolute miter. Energy is then supplied to pass the current through the posts, electrotypes, and work which will cause a weld to be performed at such high points as contact. It has been found that there will be spaced points which will contact even though the surfaces are abraded to attempt to provide them in a single plane. Thus, the seam will not be complete after such welding occurs.

After welding occurs the joined pieces are removed from the dies and have solder in the form of powdered solder material and paste applied to the joint inside such as by a brush 30, the application being shown as at 31, after which, by heating to melt the solder which is of a hard solder character, the solder will flow by capillarity or capillary action into the seam and provide a good joint. It is desirable that the solder be melted when the seam is in substantially horizontal position. It is found by this method that little or no solder flows outwardly of the case and thus very little sandbobbing and no filing need occur. The joint provided is of such a character that it is scarcely visible.

We claim:

The method of forming a hollow container which comprises forming two welded electric current conducting pieces which are substantially halves of the container, surfacing the edges thereof, accurately moving said pieces toward each other into edge-to-edge relation by electrodes contacting throughout the surface areas of the halves, welding said pieces when in such relation at such points as contact to temporarily hold them assembled and then soldering the temporarily held pieces.

ALFRED F. REILLY.
FRITZ GENGENBACH.

REFERENCES CITED

The following references are of record in the file of this patent:

UNITED STATES PATENTS

| Number | Name | Date |
| --- | --- | --- |
| Re. 17,574 | Murray | Jan. 28, 1930 |
| 1,001,049 | Knipe | Aug. 22, 1911 |
| 1,542,663 | Brenzinger | June 16, 1925 |
| 1,565,374 | Kramer | Dec. 15, 1925 |
| 1,902,955 | Holmes | Mar. 28, 1933 |
| 1,913,029 | Holmes | June 6, 1933 |
| 2,108,209 | Reilly | Feb. 15, 1938 |
| 2,149,008 | Chapman et al. | Feb. 28, 1939 |
| 2,159,900 | Le Jeune | May 23, 1939 |